UNITED STATES PATENT OFFICE.

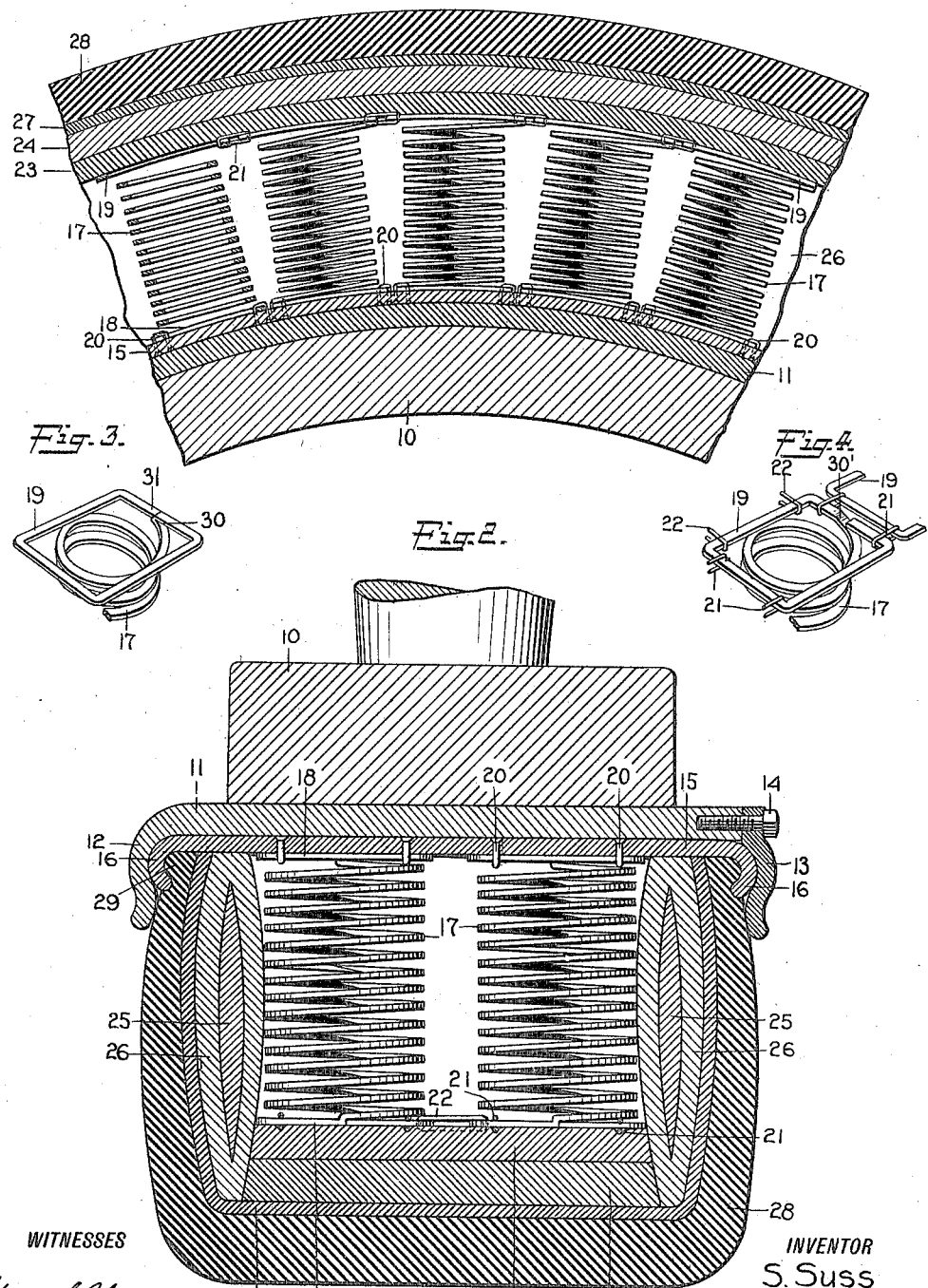

SANDER SUSS, OF NEW YORK, N. Y.

RESILIENT TIRE.

1,180,086. Specification of Letters Patent. Patented Apr. 18, 1916.

Application filed December 28, 1915. Serial No. 69,022.

*To all whom it may concern:*

Be it known that I, SANDER SUSS, a citizen of the United States, and a resident of the city of New York, borough of Manhattan, in the county and State of New York, have invented a new and Improved Resilient Tire, of which the following is a full, clear, and exact description.

This invention relates to vehicles and has particular reference to resilient tires for the wheels of the same.

Among the objects of the invention is to provide a tire to take the place of the usual and troublesome tire so commonly used on automobiles, motor cycles and other vehicles.

More definitely stated, the object is to provide a tire of a unitary and complete construction adapted to be applied to or removed bodily from a wheel rim of any standard or suitable nature, the new tire being provided with radially disposed coil springs of peculiar construction and connected to one another and to a rim portion of the tire by novel means.

Another object of the invention is to provide a unitary tire in which the spiral springs are padded on the sides with some suitable tough, fibrous material, a rubber or rubber composition shoe or tread portion being arranged on the outside of the springs and padding, and one or more tough, flexible, belt-like elements being disposed between the outer ends of the springs and the tread portion of the shoe or tire.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like characters designate the same parts in the several views, and in which—

Figure 1 is a vertical longitudinal section showing the construction of my improvements; Fig. 2 is a vertical transverse section through the same and the adjacent wheel parts; and Figs. 3 and 4 are detail perspective views of parts of modified forms of spring elements.

Referring now more particularly to the drawings, I show a wheel felly 10 to which is secured a strong, rigid, metal rim 11 having an integral flange 12 and a removable flange 13 held in place by lag bolts 14 or their equivalent.

The tire above referred to broadly comprises as its innermost member a rigid, strong, metallic ring 15 having lateral flanges 16, the inner surface of the ring being adapted to be slipped upon the exterior surface of the rim 11 and with the flanges 16 received snugly within the flanges 12 and 13. Upon removal of the fastening devices 14, the flange 13 being removed, the ring 15 and parts connected to or carried thereby may be withdrawn directly laterally from the wheel rim.

The wheel parts thus far described may be made of any suitable width whereby to accommodate one or any number of radially disposed resilient cushioning elements, shown in the form of spiral springs 17. Each spring 17 is made preferably of metal, square or rectangular in cross section throughout its length, and its inner and outermost coils indicated at 18 and 19, respectively, are in the form of open rectangles slightly longer in circumferential dimensions than in transverse dimensions, and at the same time having said transverse dimensions greater than the diameter of the cylindrical portion of the coil. The rectangular coils 18 are anchored rigidly and permanently to the outer surface of the ring 15 as by means of staples 20 or equivalent fasteners for each rectangular coil 18, one of the fasteners being arranged adjacent each corner of such coil. It will thus be seen that the inner end of each coil or cushioning element is locked permanently and squarely against the tire ring 15, and by no possibility can it be displaced either circumferentially or laterally. The outermost coil 19 of each spring is connected circumferentially of the wheel to the next adjacent coils of adjacent springs by links 21 of any suitable construction, one link being arranged at each corner of each of said coils 19. These links 21 provide suitable attachment means between adjacent coil springs and yet provide sufficient flexibility of the tire as a whole for all practical purposes. Where a plurality of series of connected coil springs are employed, and as illustrated, I show two of such series, I prefer to connect the outermost rectangular coils 19 transversely to adjacent similar coils by links 22 thereby tying the outer ends of the several coils not only each to each in the same series but from one series to another laterally or transversely, and thereby the likelihood of displacement or distortion of the cushioning means in any manner is avoided.

In assembling the improved tire after the several coil springs are connected to the ring and to one another as above described, they are put under a moderate degree of compression and then surrounding the outer ends thereof is placed a tough strong flexible band 23. This band is made preferably of the nature of a good quality of fabric machine belting having great tensile strength with respect to its weight and flexibility. The band 23, moreover, has sufficient body and rigidity to constitute a reliable tread member for the outer ends of the spring coils. In this connection it will be noted that but for the presence of the links 21 and 22, which embed themselves into the belt or band 23, the outermost rectangular coils 19 lie squarely and flatly against the inner surface of the band 23, and since this band is of a comparatively rigid and firm texture the direct impact between the coils and the parts of the tire directly on the outside of the same is sustained in a substantial or reliable manner.

Surrounding and lying directly against the outer surface of the band 23 is a cushioning band 24 of felt or some other similar flexible material serving to cushion the impact of the tire upon the roadway in connection with the coil springs and serving to protect the band 23 from damage as well as serving to relieve the likelihood of excessive wear upon the tread portions of the tire from the deleterious action of sharp stones or other rough obstacles likely to be encountered.

On each side of the coil springs is arranged a pad comprising a mass of hair 25 inclosed or surrounded by a layer of textile material such as raw cotton or the like, this cotton being indicated at 26 and arranged so as to completely surround the mass of hair considered in cross section. Each pad of textile material, made up of hair and surrounded by cotton as thus described, is designed to reach from the ring 15 out as far as the outer surface of the felt band 24 and extending circumferentially of the wheel as a complete or practically continuous circle.

A jacket 27 of a heavy tough fibrous material such as strong canvas or the like is applied around the outside of the felt band 24 and inclosing the outer sides of both of the fibrous pads. The jacket is substantially U-shape in cross section and has its edges lying in contact with the ring 15. Directly adjacent the outer surface of the jacket is the shoe or tire proper, indicated as a whole at 28, which like the jacket is of U-shape in cross section and has its inner or free edges lying flush with the edges of the jacket and gripped at 29 within and held by the ring flanges 16. It will be noticed that these flanges 16 will coöperate with the edge or beaded portions of the shoe with sufficient effectiveness to prevent any possibility of rupture or separation of the tire from the rim or from the rim flanges.

The tire shoe 28 should be made of any suitable rubber or rubber composition of a nature somewhat similar to tire shoes heretofore made but is different from the common shoe with respect to the cross sectional form providing a broad or more stable form of tread. Because of the considerable breadth of the tire with respect to its depth or diameter in proportion to the diameter of the wheel, greater stability and more satisfactory operation are secured.

Referring now to Figs. 3 and 4, it will be noticed that the individual springs may be variously constructed. In Fig. 3, that portion of the cylindrical part of the spring terminates in a comparatively sharp bend at 30 where the rectangular end coil is continued, the free outer end of the end coil at 31 being adjacent the sharp portion 30. In Fig. 4, on the other hand, the rectangular coil merges into the cylindrical portion of the spring at 30' with a comparatively slight offset or shoulder.

I claim:

In a resilient tire, the combination of a ring having side clencher flanges, a plurality of series of coil springs arranged radially on the outside of the ring, means anchoring the inner end of each spring in fixed position against the ring, the series of springs being arranged parallel to one another, links connecting the outer coils of the springs of each series together circumferentially of the tire, other links connecting adjacent series transversely of the tire, a tough flexible band applied directly against the outer surfaces of the outermost coils of the springs and into which portions of said links are embedded, a felt band surrounding the tough flexible band, pads of hair surrounded with cotton located on the outside of the series of springs and extending from adjacent the edges of the felt band to the surface of the ring, a heavy canvas jacket applied over the felt band and outer sides of the pads, and a tough flexible shoe applied on the outside of the jacket substantially co-extensive therewith and having the inner free edges thereof beaded and interlocked with the edges of the ring.

In testimony whereof I have signed my name to this specification in the presence of two subscribing witnesses.

SANDER SUSS.

Witnesses:
 GEO. L. BEELER,
 RUDOLPH THIES.

Copies of this patent may be obtained for five cents each, by addressing the "Commissioner of Patents, Washington, D. C."